United States Patent [19]

O'Reilly et al.

[11] Patent Number: 5,651,555

[45] Date of Patent: Jul. 29, 1997

[54] FLUID-OPERATED LEVELING VALVE SYSTEMS

[75] Inventors: Paul Bernard O'Reilly, Cerritos; Tariq Latif, Downey; Mann Nguyen, Walnut, all of Calif.

[73] Assignee: Barksdale, Inc., Los Angeles, Calif.

[21] Appl. No.: 557,722

[22] Filed: Nov. 13, 1995

[51] Int. Cl.⁶ ............................................. B60G 17/056
[52] U.S. Cl. .................. 280/6.1; 280/714; 267/64.16; 137/625.21; 137/119.09
[58] Field of Search ................... 280/6.1, 6.12, 280/840, 714, DIG. 1; 267/64.16, 64.28; 137/625.21, 118.06, 119.09

[56] References Cited

U.S. PATENT DOCUMENTS

| | | | |
|---|---|---|---|
| 2,888,272 | 5/1959 | Fletcher | 280/6.1 |
| 2,919,931 | 1/1960 | Cislo | 280/6.1 |
| 2,954,987 | 10/1960 | Whelan | 280/714 |
| 2,962,297 | 11/1960 | Cislo | 280/DIG. 1 |
| 2,974,675 | 3/1961 | Cislo | 280/714 |
| 3,561,479 | 2/1971 | Archer | 137/625.21 |
| 5,161,817 | 11/1992 | Daum et al. | 280/714 |

Primary Examiner—Brian L. Johnson
Assistant Examiner—Peter C. English
Attorney, Agent, or Firm—Benoit Law Corporation

[57] ABSTRACT

A supported structure is leveled against positional variations relative to a supporting structure with a fluid suspension system between the supported structure and the supporting structure. The fluid suspension system has a first fluid leveling valve for adjustment and operation of the supported structure to and at a first level relative to the supporting structure, and is provided with a second fluid leveling valve for adjustment and operation of the supported structure to and at an alternative second level relative to the supporting structure. The supported structure is adjusted with the first fluid leveling valve to the first level relative to the supporting structure. The first level is sensed. The activated first fluid leveling valve is operated in response to the sensed first level to maintain the first level against positional variations. The supported structure is alternatively adjusted with the second fluid leveling valve to the second level relative to the supporting structure. The second level is sensed, and the activated second fluid leveling valve is operated in response to the sensed second level to maintain the second level against positional variations.

38 Claims, 7 Drawing Sheets

FLUID-OPERATED LEVELING VALVE SYSTEMS

BACKGROUND OF THE INVENTION

Subject invention relates to leveling of supported structures relative to supporting structures with fluid suspension systems, and to leveling of vehicular frame structures relative to axle structures of road vehicles with fluid spring systems.

SUMMARY OF THE INVENTION

It is a general object of the invention to provide improved leveling of supported structures relative to supporting structures with fluid suspension systems.

It is a germane object of the invention to provide improved leveling of vehicular frame structures relative to axle structures of road vehicles with fluid spring systems.

It is a related object of the invention to provide improved level or height control valves.

It is also a related object of the invention to provide improved level or height control valve combinations for establishing and maintaining alternative ride heights or other levels.

It is a further object of the invention to provide vehicles with alternative ride heights for different operating or load conditions.

Other objects will become apparent in the further course of this disclosure.

From a first aspect thereof, the invention resides in a method of leveling a supported structure capable of carrying loads against positional variations relative to a supporting structure with a fluid suspension system between the supported structure and the supporting structure. This aspect of the invention resides, more specifically, in the improvement comprising, in combination, providing the fluid suspension system with a first fluid leveling valve for adjustment and operation of the supported structure to and at a first level relative to the supporting structure, providing the fluid suspension system with a second fluid leveling valve for adjustment and operation of the supported structure to and at an alternative second level relative to the supporting structure, adjusting the supported structure with the first fluid leveling valve to the first level relative to the supporting structure, sensing the first level, operating the first fluid leveling valve in response to the sensed first level to maintain the first level against positional variations, sensing load variations on said supported structure, alternating between leveling with said first fluid leveling valve and leveling with said second fluid leveling valve in response to said sensing of load variations, including alternatively adjusting the supported structure with the second fluid leveling valve to the second level relative to the supporting structure, sensing the second level, and operating the second fluid leveling valve in response to the sensed second level to maintain the second level against positional variations.

In a method of leveling a supported structure against positional variations relative to a supporting structure with a fluid suspension system between said supported structure and said supporting structure, the improvement comprising, in combination, providing said fluid suspension system with a first fluid leveling valve for adjustment and operation of said supported structure to and at a first level relative to said supporting structure, providing said fluid suspension system with a second fluid leveling valve for adjustment and operation of said supported structure to and at an alternative second level relative to said supporting structure supporting said supported structure with fluid pressure, alternatively regulating said fluid pressure with said first and second fluid leveling valves, sensing said fluid pressure, and alternating between leveling with said first fluid leveling valve and leveling with said second fluid leveling valve in response to said sensed fluid pressure, including adjusting said supported structure with said first fluid leveling valve to said first level relative to said supporting structure, sensing said first level, operating said first fluid leveling valve in response to said sensed first level to maintain said first level against positional variations, alternatively adjusting said supported structure with said second fluid leveling valve to said second level relative to said supporting structure, sensing said second level, and operating said second fluid leveling valve in response to said sensed second level to maintain said second level against positional variations.

In a method of leveling a supported structure against positional variations relative to a supporting structure with a fluid suspension system between said supported structure and said supporting structure, wherein said supporting structure includes an axle structure of a road vehicle, said supported structure includes a vehicular frame structure supported by said axle structure, and said fluid suspension system is a vehicular fluid suspension system between said vehicular frame structure and said axle structure, the improvement comprising in combination, providing said vehicular fluid suspension system with a first fluid leveling valve for adjustment and operation of said supported structure to and at a first ride height of said vehicular frame structure, providing said vehicular fluid suspension system with a second fluid leveling valve for adjustment and operation of said supported structure to and at an alternative second ride height of said vehicular frame structure, different from said first ride height, sensing pressure in said vehicular fluid suspension system, and alternating between leveling with said first fluid leveling valve and leveling with said second fluid leveling valve in response to said sensed pressure, including adjusting said vehicular frame structure with said first fluid leveling valve to said first ride height, sensing said first ride height, operating said first fluid leveling valve in response to the sensed first ride height to maintain said first ride height against positional variations, alternatively adjusting said vehicular frame structure with said second fluid leveling valve to said second ride height, sensing said second ride height, and alternatively operating said second fluid leveling valve in response to the sensed second ride height to maintain said second ride height against positional variations.

From a related aspect thereof, the invention resides in methods of leveling a supported structure against positional variations relative to a supporting structure with a fluid suspension system between the supported structure and the supporting structure, including a first fluid leveling valve and a level sensor for the fluid suspension system between the supported structure and the supporting structure, providing an alternative second fluid leveling valve including the level sensor, and selectively operating of the supported structure with said first and second fluid leveling valves at any one of three different operating levels relative to the supporting structure against positional variations.

From a related aspect thereof, the invention resides in apparatus for leveling a supported structure against positional variations relative to a supporting structure with a fluid suspension system between said supported structure and said supporting structure. This aspect of the invention resides, more specifically, in the improvement comprising, in combination, that fluid suspension system includes between the supported structure and the supporting structure a level sensing lever, a first fluid leveling valve having a first operating rotor connected to the level sensing lever, and a second fluid leveling valve having a second operating rotor connected to the level sensing lever and angularly offset relative to the first operating rotor, the fluid suspension system includes between the supporting structure and the supported structure a fluid spring structure, and a fluid path switcher connecting the fluid spring structure selectively to the first fluid leveling valve, and alternatively to the second fluid leveling valve a fluid pressure sensor in said fluid suspension system, and a fluid path switcher actuator connected between said fluid pressure sensor and said fluid path switcher so that said fluid path switcher selectively connects said fluid spring structure to said first fluid leveling valve, and alternatively to said second fluid leveling valve in response to pressure variations sensed by said fluid pressure sensor.

From a related aspect thereof, the invention resides in apparatus for leveling a vehicular frame structure with a vehicular fluid suspension system relative to an axle structure of a road vehicle against positional variations. This aspect of the invention resides, more specifically, in the improvement comprising, in combination, a fluid spring structure, a first fluid leveling valve, a second fluid leveling valve and a ride height sensor in the vehicular fluid suspension system between the vehicular frame structure and the axle structure, the first fluid leveling valve and ride height sensor for operation of the vehicular frame structure at a first ride height relative to a road surface against positional variations, the second fluid leveling valve and ride height sensor for operation of the vehicular frame structure at a second ride height relative to the road surface against positional variations, and a fluid path switcher connecting the fluid spring structure selectively to the first fluid leveling valve, and alternatively to the second fluid leveling valve and a fluid pressure sensor connected between said fluid spring structure and said fluid path switcher so that said fluid path switcher selectively connects said fluid spring structure to said first fluid leveling valve, and alternatively to said second fluid leveling valve in response to pressure variations sensed by said fluid pressure sensor.

From a related aspect thereof, the invention resides in apparatus for leveling a vehicular frame structure against load variations and road irregularities relative to an axle structure with a fluid suspension system between the vehicular frame structure and the axle structure. This aspect of the invention resides, more specifically, in the improvement comprising, in combination, the fluid suspension system including between the vehicular frame structure and the axle structure a fluid spring structure, a ride height sensing lever, a first fluid leveling valve having a first operating rotor connected to the ride height sensing lever, and a second fluid leveling valve having a second operating rotor connected to the ride height sensing lever and angularly offset relative to the first operating rotor, a fluid path switcher connecting the fluid spring structure selectively to the first fluid leveling valve, and alternatively to the second fluid leveling valve and a fluid pressure sensor connected between said fluid spring structure and said fluid path switcher so that said fluid path switcher selectively connects said fluid spring structure to said first fluid leveling valve, and alternatively to said second fluid leveling valve in response to pressure variations sensed by said fluid pressure sensor.

BRIEF DESCRIPTION OF THE DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which.

DESCRIPTION OF PREFERRED EMBODIMENTS

The drawings constitute a written description of the invention and of embodiments thereof, and also illustrate this description of preferred embodiments.

In this respect, the drawings illustrate methods and apparatus for leveling a supported structure 10 against positional variations 12 relative to a supporting structure 13 with a fluid suspension system 14 between that supported structure and the supporting structure. By way of example, the supporting structure 13 may be an axle structure of a road vehicle, and the supported structure 10 may be a vehicular frame structure supported by that axle structure, such as in U.S. Pat. No. 5,161,817, by James W. Daum; Tariq Latif and Paul B. O'Reilly for Fluid-Operated Leveling Valve Systems, issued Nov. 10, 1992, assigned to the common assignee hereof and, other patents cited therein, herewith incorporated by reference herein.

Alternatively the supported structure may be a vehicle cab or body supported by the suspension system on the vehicle frame, or a platform supported by such fluid suspension system on a moveable or stationary supporting structure. In view of the broad utility of the subject invention, FIG. 2 shows the supporting structure 13 only broadly, and shows only part of the supported structure 10.

Figure 1:
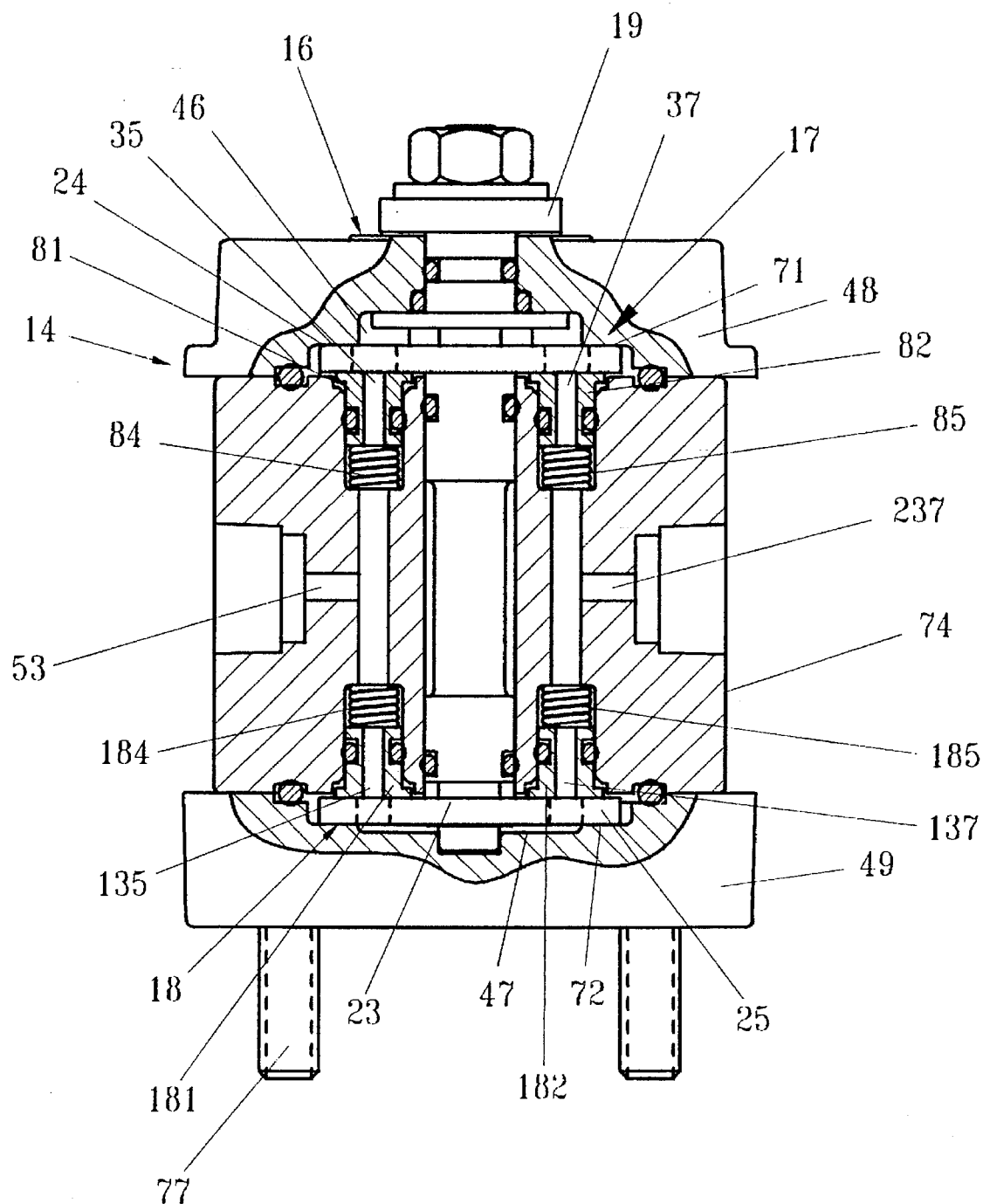
FIG. 1 is an elevation, partially in section on a line 1—1 in FIG. 6, of a dual fluid valve according to an embodiment of the invention.
Figure 2:
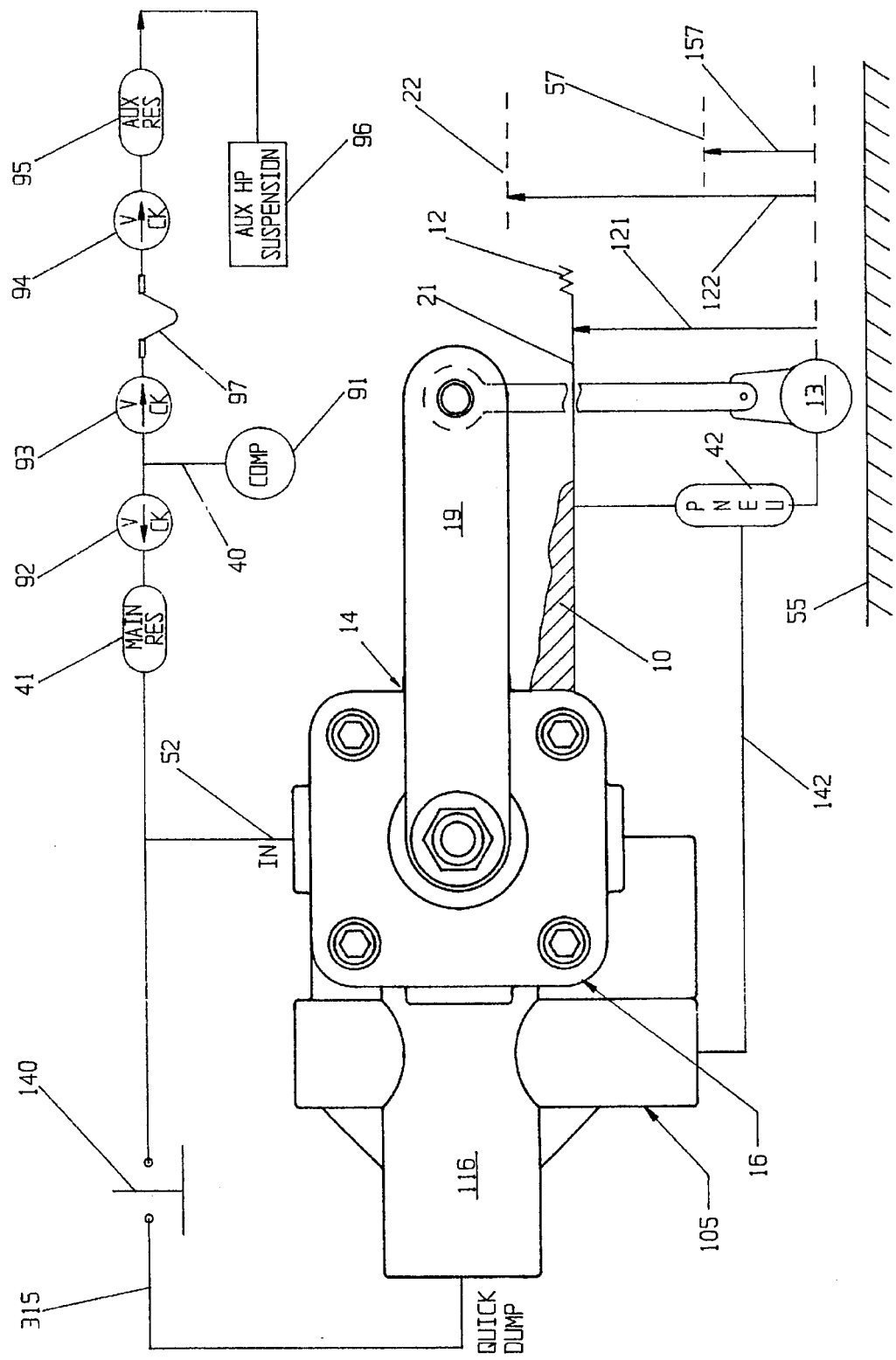
FIG. 2 is a top view of the fluid valve shown in FIGS. 1, 6 and 7 with a schematic of related pneumatic equipment according to an embodiment of the invention.

In particular, FIG. 1 shows a fluid leveling valve system 16 comprising a first fluid leveling valve 17, a second fluid leveling valve 18 and a level sensor lever 19 for the fluid suspension system 14 between the supported structure 10 and the supporting structure 13, such as in FIG. 2.

The first fluid leveling valve 17 including the level sensor lever 19 is adapted for operation of the supported structure 10 at a first level 21 relative to the supporting structure 13 against positional variations indicated diagrammatically at 12.

On the other hand, the second fluid leveling valve 18 including the level sensor lever 19 is adapted for operation of the supported structure 10 at a second level 22 relative to the supporting structure 13 against positional variations 12.

In functional terms, the fluid suspension system 14 is provided with a first fluid leveling valve 17 for adjustment and operation of the supported structure 10 to and at a first level 21 relative to the supporting structure, and the fluid suspension system is further provided with a second fluid leveling valve 18 for adjustment and operation of that supported structure 10 to and at a different second level 22 relative to that supporting structure 13.

Within the scope of the invention, the two leveling valves 17 and 18 may be distinct and separate from each other, and each may have its separate level sensor lever 19. However, according to the illustrated preferred embodiment of the invention, the first and second leveling valves are combined into one valve system or structure 16.

The first and second fluid leveling valves typically are ganged together, and preferably are ganged in tandem between the supported structure 10 and the supporting structure 13, such as by a common rotor shaft 23, as seen in FIG. 1, for instance.

The first and second fluid leveling valves 17 and 18 are provided with first and second ranges of operation for leveling the supported structure 10 differently relative to the supporting structure 13. According to a preferred embodiment of the invention, the first fluid leveling valve 17 is provided with a first range of operation for movement and operation of the supported structure 10 to and at a first level 21 relative to the supporting structure, and the second fluid leveling valve 18 is provided with a different second range of operation relative to such first range of operation for adjustment and operation of the supported structure 10 to and at a different second level 22 relative to that supporting structure 13. Such different ranges of operation may be operationally offset relative to each other. Within the scope of the invention and such terminology, ranges of the same kind may in effect be made into different ranges so to speak by operationally offsetting such ranges relative to each other, such as shown in FIGS. 3 to 5, for instance.

As will become apparent in the further course of this disclosure, the first fluid leveling valve 17 is selectively rendered active for operation of the supporting apparatus at the first range and the second fluid leveling valve 18 is alternatively rendered active for operation of the supporting apparatus at the second range.

The first and second fluid leveling valves 17 and 18 preferably are rotary valves having different rotary positions for leveling the supported structure 10 differently relative to the supporting structure 13.

in particular, the first fluid leveling valve 17 may be provided with a first range of operation for adjustment and operation of the supported structure 10 to and at the first level 21 relative to the supporting structure and the second fluid leveling valve may be provided with a second range of operation for adjustment and operation of the supported structure 10 to and at the different second level 22 relative to that supporting structure 13.

An embodiment of the invention provides a phase difference 26 between such first and second angular ranges of operation, such as seen in FIG. 3. These first and second angular ranges may be identical, as far as range is concerned.

While rotary valves are shown by way of currently preferred example, slide valves or other linear valves, rather than rotary valves may be provided or used within the scope of the invention.

The fluid suspension system 14 according to the illustrated embodiment of the invention, includes between the supported structure 10 and the supporting structure 13 a level sensing lever 19, a first fluid leveling valve 17 having a first operating rotor 24 connected to that level sensing lever, and a second fluid leveling valve 18 having a second operating rotor 25 connected to that level sensing lever 19. That second operating rotor 25 is angularly offset relative to the first operating rotor 24, or these first and second operating rotors have therebetween a phase difference, as may be seen at 26 in FIG. 3, for instance.

In particular, FIGS. 3 to 5 show the operating rotors as first and second rotary discs 24 and 25 flipped over in plane view for easier comprehension. These operating rotors or rotary discs 24 and 25 preferably are ganged in tandem by the common shaft 23 shown diagrammatically in FIG. 3. For present purposes and as to its possible physical structure shown in FIG. 1, for instance, such shaft may have a hexagonal portion at each rotary disc 24 and 25 for engaging a corresponding hexagonal aperture 28 and 29 in each of these discs, respectively.

As may be seen from a comparison of the upper and lower rotary discs 24 and 25 with each other in FIG. 3, the pair of operating slots 31 and 32 is oriented differently with respect to the pair of operating slots 131 and 132 in such upper and lower rotary discs 24 and 25, respectively.

By way of example, if the radial centerline 33 between the pair of slots 31 and 32 or 131 and 132 is considered as "zero phase" in either disc 24 and 25, then it will be seen from FIG. 3 that the rotor shaft apertures 28 and 29 in the discs 24 and 25 are offset relative to each other at a phase difference or phase angle 26, so to speak.

As to FIG. 3, this presupposes that the corresponding hexagonal drive portions of the common rotor shaft 23 are oriented the same way. That need, however, not be the case within the scope of the invention.

Rather, by way of alternative example within the scope of the invention, FIG. 5 shows an embodiment wherein each hexagonal rotor drive aperture 28 and 29 is oriented the same way relative to its corresponding pair of fluid flow slots 31 and 32 or 131 and 132, respectively. However, in that case, it is the hexagonal disc drive portions 20 and 30 of the common rotor shaft 25 that are offset relative to each other at a phase difference or phase angle 126 as apparent from the different spacings of the vertical lines for the side view illustration of the upper hexagonal drive shaft portion 20 and of the lower hexagonal drive shaft portion 30 in the diagrammatic illustration of FIG. 5.

Of course, hexagonal shapes for the common rotor shaft disc drive portions 20 and 30 and for the corresponding rotor disc drive apertures 28 and 29 are only examples, since rectangular, square, triangular, keyed, slot-like or any other non-circular or non-rotational configurations may be employed instead thereof within the scope of the invention, including fasteners that secure the rotary discs 24 and 25 in different angular positions relative to a rotor shaft 23 that may then be cylindrical.

Also, whether to offset the phase of the rotor shaft disc drive portions 20 and 30 or the phase of the rotor disc drive apertures 28 and 29 may largely be a matter dictated by such considerations as manufacturing, stocking and retrofitting convenience.

For instance, only one kind of disc need to be manufactured and stocked for a particular leveling valve structure 16, if the orientation of the drive apertures 28 and 29 is the same for both discs 24 and 25. In other words, the rotor discs 24 and 25 may be identical in structure, if the rotor shaft disc drive portions 20 and 30 are offset relative to each other, such as seen in FIG. 5.

On the other hand, if variations of the different leveling heights 21 and 22 are contemplated, it may be easier to provide rotor discs of different central aperture orientation so that, for instance, either of the discs 24 or 25 can be exchanged for a new disc for a different level height 21 or 22, without disassembly of the entire valve, as would practically be required for a replacement of a rotor drive shaft 23 having, for instance, the orientation of the disc drive portions 20 and 30 shown in FIG. 5, by another rotor drive shaft, such as symbolically illustrated at 123 in FIG. 4, providing disc drive portions (20, 30 in FIG. 5) oriented differently for a provision of a phase angle which is different from the angle 126 shown in FIG. 5, thereby realizing a change in the predetermined level height 21 or 22.

Definitions of offset and phase shifts employed herein and in the appendant claims are intended to be broad enough to cover all embodiments, including those set forth in FIGS. 3 to 5.

As seen in FIGS. 1 to 5, the combined fluid leveling valve 16 is provided with first, second and third fluid ports 35, 36 and 37 for the first leveling valve structure 17 and with corresponding first, second and third fluid ports 135, 136 and 137 for the second leveling valve structure 18.

By way of example, the fluid ports 35 and 135 may be fluid input ports through which fluid is supplied to the leveling valve 17 or 18 from a fluid source 40 including, for instance, a fluid reservoir 41.

On the other hand, the fluid ports 36 and 136 may, for instance, be fluid supply ports through which the activated leveling valve 17 or 18 supplies fluid to pneumatic, hydraulic or hydropneumatic leveling and support systems which are arranged between the supported structure 10 and the supporting structure 13 and which pneumatically, hydraulically or hydropneumatically support and level the supported structure 10 relative to the supporting structure 13.

For brevity, the expression "air springs" has been and may be employed for such fluid-operated supporting apparatus 42, as long as their possible pneumatic, hydraulic or hydropneumatic nature is kept in mind.

The third port 37 or 137 may be a fluid exhaust port through which fluid may be exhausted or recirculated from air springs 42 to restore a desired level 21 or 22 of the supported structure 10 relative to the supporting structure 13 or relative to a floor or road surface, for instance.

The operation of the fluid valve 17 includes moving the slotted disc 24 to and among different angular positions relative to the first, second, and third fluid ports 35, 36 and 37, and alternatively interconnecting such first, second and third fluid ports via that slotted disc differently in such different angular positions.

For example, as seen in FIG. 3, one of the fluid ports 37 is blocked with the first disc 24 in one of its angular positions, which may be a fluid supply position. According to FIG. 4, at least the two fluid ports 35 and 37 are blocked with the disc 24 in another one of its angular positions, which may be a rest or stable position. As seen in FIG. 5, the fluid port 35 may be blocked by the disc 24 in another one of its angular positions, which may be a fluid exhaust position.

FIGS. 3 to 5 also show the second rotary disc 25 in various corresponding angular positions in the context of the fluid ports 135, 136 and 137.

In particular, FIG. 3 shows the rotary disc 25 in its rest position, wherein at least the two fluid ports 135 and 137 are blocked by the disc. FIGS. 4 and 5, on the other hand show the rotary disc 25 and thereby the valve 18 in its fluid exhaust position and in its fluid supply position, respectively.

Within the scope of the invention, the rotary discs 24 and 25 could be slotted in the sense of having grooves in the side of the disc facing the fluid ports 35 to 37 or 135 to 137. These grooves could be arcuate, as the grooves 31 and 32 shown in the drawings. Alternatively, the illustrated grooves 31, 32, 131, 132 may represent galleries that extend through the disc 24 or 25.

To keep the slots 31, 32, 131, 132 as short as shown in FIGS. 3 to 5 only the ports 35 and 37 or 135 and 137 are brought into contact with the discs 24 and 25, respectively, while the port 36 or 136 may be recessed inwardly from the disc 24 or 25, respectively, so that such fluid spring port is never blocked by the disc, but is in constant communication with a fluid chamber 46 or 47 at that disc 24 or 25.

Accordingly, fluid can flow alternatively along the rotary discs 24 and 25 as indicated by dotted lines 44 and 45 shown in FIGS. 3 to 5; such flow typically taking place only in and along the pressurized fluid chamber 46 or 47.

Pursuant to a preferred embodiment of the invention, the rotary discs 24 and 25 are slotted by providing the slots as slot-like apertures 31, 32, 131, 132 through that disc 24 or 25. If such disc is of aluminum or of another metal, such slots may be formed by stamping. There are, however, many ways, including machining, electroerosion, molding, etc., in which these slots and a central slot or non-circular aperture 28 or 29 can be formed.

Such non-circular aperture 28 or 29 may be provided for engagement by a complementary non-circular portion of the rotor shaft 23 whereby the rotary disc 24 or 25 is angularly moveable about the axis 51.

As seen in FIGS. 1 to 5, pressurized fluid 52 is supplied via at least one fluid line 53 to the fluid input valve ports 35 and 135. In FIGS. 3 to 5 such line is shown as a pair 53—53, since it is possible within the scope of the invention to activate one of the leveling valves 17 and 18, while deactivating the other leveling valve 18 or 17 of the pair, by supplying fluid through a double-throw fluid switcher 54 to only one of the two leveling valves at a time. However, according to the presently preferred embodiment of the invention, the component 54 is merely a fluid coupling or common valve input port, if such component is used at all.

Referring to FIG. 3, the second fluid valve 18 is in its rest position wherein it maintains the supported structure 10 at its so-called second level 22 relative to the supporting structure 13 with respect to a floor or road surface 55, for instance. This second fluid valve 18 maintains the supported structure at such second level, as long as the fluid spring 42 is connected to its port 136.

Alternatively, if the fluid spring is connected to the port 36 of the first fluid leveling valve 17, then that first fluid leveling valve maintains the supported structure at the so-called first level 21.

In particular, because of the phase shift 26 or 126 at which the first rotor disc 24 is oriented relative to the second rotor disc 25, the first and second ports 35 and 36 are interconnected at the first disc 24, when the second disc 25 is in its rest position. Accordingly, as seen in FIG. 3, pressurized fluid 52 can flow via 54, 53, 35, 45, 36 and 61 to the air spring 42, thereby supplying pressurized fluid to such air spring as needed to realize and maintain the first level 21 of the supported structure 10. Fluid may exhaust from the fluid valve, such as indicated at 62 and 63 in FIG. 5, during achievement of such equilibrium condition at the first level 21, at which the first fluid leveling valve 17 attains its angular rest position, as indicated in FIG. 4.

If the supported structure 10 should overshoot its desired level 21, then fluid would exhaust or be dumped from the air spring 42, such as via a path 62, 44 and 63 shown in FIG. 5. Conversely, if the supported structure 10 should fall below its then desired first level 21 while the valve 17 is active, then pressurized fluid 52 will be supplied in the angular position of the rotary disc 24 shown in FIG. 3 along a fluid path 53, 35, 45, 36, 61.

If it is desired or necessary for the supported structure 10 to revert to its second level 22, then the air spring 42 is connected to the second fluid leveling valve 18, whereby pressurized fluid 52 is supplied via a path 53, 135, 45, 136 and 66 shown in FIG. 5 to the air spring 42, until the equilibrium position of the supported structure 10 is reestablished at the second level 22, such as shown in the lower portion of FIG. 3.

Overshoots beyond such second level 22 can then be handled by exhaust of fluid in the manner indicated by arrows 67 and 68 in the lower portion of FIG. 4.

A common exhaust port 237 may be provided for both valve fluid ports 37 and 137.

In this respect and in general, the fluid typically is exhausted to atmosphere if such fluid is air. Conversely, if the fluid is a hydraulic fluid or a special gas, for instance, then such fluid preferably is recycled to a compressor 91 or other recompressing apparatus.

In this and any other manner within the scope of the invention, the fluid suspension system selectively renders the first fluid leveling valve 17 active, while rendering the second fluid leveling valve 18 inactive or unused at the time, adjusts the supported structure 10 with such active first fluid leveling valve to a first level 21 relative to the supporting structure 13, senses that first level, and operates the active first fluid leveling valve 17 in response to such sensed first level to maintain that first level against positional variations. The fluid suspension system according to the invention alternatively renders such first fluid leveling valve 17 inactive or unused at the time, while using the second fluid leveling valve 18, adjusts the supported structure 10 with such active second fluid leveling valve 18 to a second level 22 relative to the supporting structure 13, senses such second level, and operates the then active second fluid leveling valve in response to that sensed second level 22 to maintain such second level against positional variations.

This aspect of the invention may be implemented in a variety of valve structures.

By way of examples thrust bearings and other devices may be employed to mount the rotary discs 24 and 25 within the leveling valve structure 16.

According to a preferred embodiment of the invention shown in FIG. 1, the top and bottom parts 48 and 49 of the leveling valve housing are provided with internal shoulders 71 and 72 adapted to serve as bearings for the rotary discs 24 and 25.

Pressure-tight chambers 46 and 47 are provided on the inside of the top portion 48 and base 49, respectively. Such top and base may be sealed to the valve proper 74, such as by means of O-rings and bolts tightening such valve parts together. Also, bolts 77 may be provided to attach the dual leveling valve 16 to a structure or support, such as to the supported structure 10.

Providing internal shoulders 71 and 72 as bearings for rotary discs 24 and 25 has significant advantages, including a dispensation with the familiar kinds of thrust bearings typical in fluid valves.

The valve top portion 48 and base 49 may be of a material suitable as a bearing material, at least at the shoulders 71 and 72.

Oil and temperature resistant plastic materials with self-lubricating properties are particularly suitable. These include acetal homopolymers or copolymers, such as those sold under the trade name DELRIN and CELCON; nylon, such as nylon products sold under the trade name ZYTEL; polypropylene, such as sold under the trade name PROFAX-7523; thermoplastic polyester, such as sold under the trade name VALOX; polyphenylene oxide, such as sold under the trade name NORYL, and polycarbonate, such as sold under the trade name LEXAN-500. In practice, such products may be provided with modifiers, such as glass fill, calcium carbonate, talc, graphite, etc.

As seen in FIG. 1, fluid ports 35, 37, 135, and 137 are provided with or include fluid port inserts 81, 82, 181 and 182 which are biased by springs 84, 85, 184 and 185 against the rotary discs 24 and 25, respectively, which, in turn, are thereby biased against their bearing shoulders 71 and 72.

Reference may also be had to the above mentioned U.S. Pat. No. 5,161,817, by James W. Daum, Tariq Latif and Paul B. O'Reilly, issued Nov. 10, 1992 for Fluid-Operated Leveling Valve Systems, and incorporated by reference herein. As in that patent, the present fluid ports 35, 37, 135 and 137 or fluid port inserts 81, 82, 181 and 182 may have laterally extended fluid-tight seals around the port holes to reduce undesired response of the fluid valve system to insignificant movements of the rotor discs 24 and 25, such as due to common irregularities of the road, or to avoid an accidental or undesired escape of fluid from or through fluid ports 35, 37, 135 and 137.

Reference may in this respect also be had to U.S. Pat. No. 3,014,499, by Lilburn S. Barksdale, issued Dec. 26, 1961 for Rotary Valve, herewith incorporated by reference herein, and to the numerous similar valves manufactured and sold by Barksdale, Inc. in Vernon, Calif., under their registered "SHEAR-SEAL" trademark.

By way of example, the fluid valve 16 may be used in lieu of the fluid valve illustrated in FIGS. 3 to 5 of that Daum et al U.S. Pat. No. 5,161,817 with reference to its FIGS. 1 and 2 thereof.

In particular, the reservoir 41 of the fluid source 40 may be charged with fluid by a compressor 91 through a check valve 92. That reservoir 41 may be the main reservoir, if there is also an auxiliary reservoir 95. That auxiliary reservoir may have its own compressor, or may be charged with fluid from the compressor 91 through check valves 93 and 94. Other check valves or fluid flow regulating devices may be added as desired or required, such as to prevent the main reservoir from emptying suddenly through either valve.

By way of example, the main reservoir 41 may belong to the air spring system of a tractor, while the auxiliary reservoir may belong to a similar air spring system 96 of a trailer having its own fluid valve or valves similar to valve 16 and its own fluid springs similar to spring 42.

The usual selectively engageable and disengageable hose coupling 97, known in American truck driver parlance as "glad hand," may be provided between the tractor and the trailer.

In this respect and in general, the supporting structure 13 may include an axle structure of a truck or other road vehicle, and the supported structure 10 may include a load bed or other vehicular frame structure supported by that axle structure. The above mentioned positional variations may include variations from load variations and/or from different operating conditions.

The fluid suspension system 14 then is a vehicular fluid suspension system between the vehicular frame structure and the axle structure. The first and second fluid leveling valves 17 and 18 are part of such vehicular fluid suspension system.

The above mentioned first level 21 may be a first ride height 121 of the vehicular frame structure or other supported structure 10 relative to the axle structure or other supporting structure 13, and the second level 22 may be a second ride height 122 of the vehicular frame structure, different from the first ride height 121. The vehicular frame structure is adjusted with the first fluid leveling valve 17 to the first ride height. Such first ride height is sensed, such as with the first fluid leveling valve via lever 19, and the first fluid leveling valve 17 is operated in response to such sensed first ride height to maintain that first ride height 121.

The vehicular frame structure alternatively is adjusted with the second fluid leveling valve 18 to the second ride height 122. Such second ride height is sensed, such as with the second fluid leveling valve via lever 19, and the second fluid leveling valve 18 is operated in response to such sensed second ride height to maintain that second ride height 122.

In structural terms, the apparatus for leveling a vehicular frame structure 10 with a vehicular fluid suspension system 14 relative to an axle structure 13 of a road vehicle against load positional variations, comprises a first fluid leveling valve 17 and a second fluid leveling valve 18 and a ride height sensor lever 19 in that vehicular fluid suspension system 14 between the vehicular frame structure 10 and the axle structure 13.

The first fluid leveling valve 17 including its first ride height sensor is adapted for operation of the vehicular frame structure or other supported structure 10 at a first ride height 121 relative to the axle structure or other supporting structure 13. The second fluid leveling valve 18 including its second ride height sensor is adapted for alternative operation of the vehicular frame structure 10 at a second ride height 122 relative to axle structure or other supporting structure 13.

The first and second fluid leveling valves 17 and 18 may have different modes of operation corresponding to different ride heights 121, 122, etc. Such different modes may be ranges of operation offset relative to each other, such as by an angle 26 or 126 or 326, in proportion to a difference between the first and second ride heights 121 and 122 or 157.

According to a related embodiment, the fluid suspension system 14 includes between the vehicular frame structure 10 and the axle structure 13 a ride height sensing lever 19, a first fluid leveling valve 17 having a first operating rotor 24 connected to that ride height sensing lever, and a second fluid leveling valve 18 having a second operating rotor 25 connected to the ride height sensing lever 19 and angularly offset relative to the first operating rotor, such as shown at 26 or 126 in FIGS. 3 to 5.

According to an embodiment of the invention, the offset or phase difference 26 or 126 may be variable. For example, the second level 22 or ride height 122 may be varied with respect to the first level 21 or ride height 121 by varying the phases 26 and 126 relative to each other.

Figure 3A:
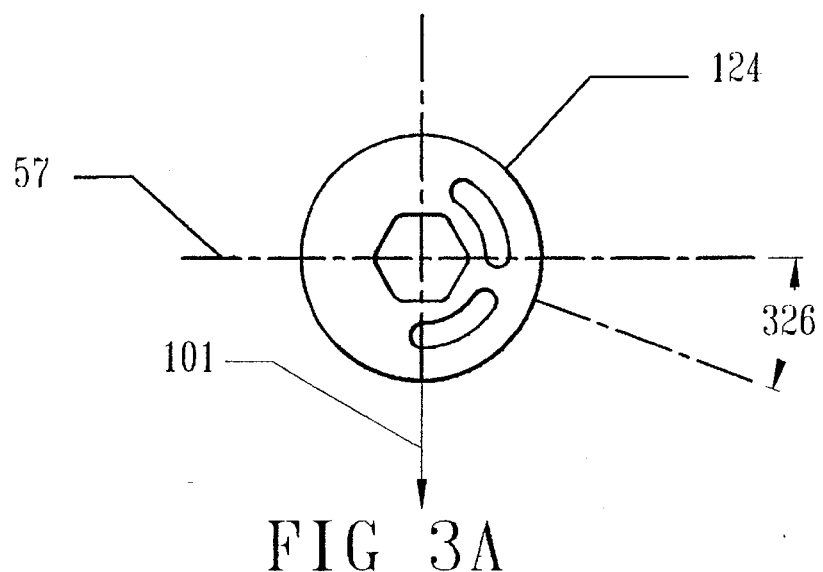
FIG. 3A is a diagrammatic view of an additional valve rotor usable in conjunction with one of the valve rotors shown in FIG. 3.
Figure 3:
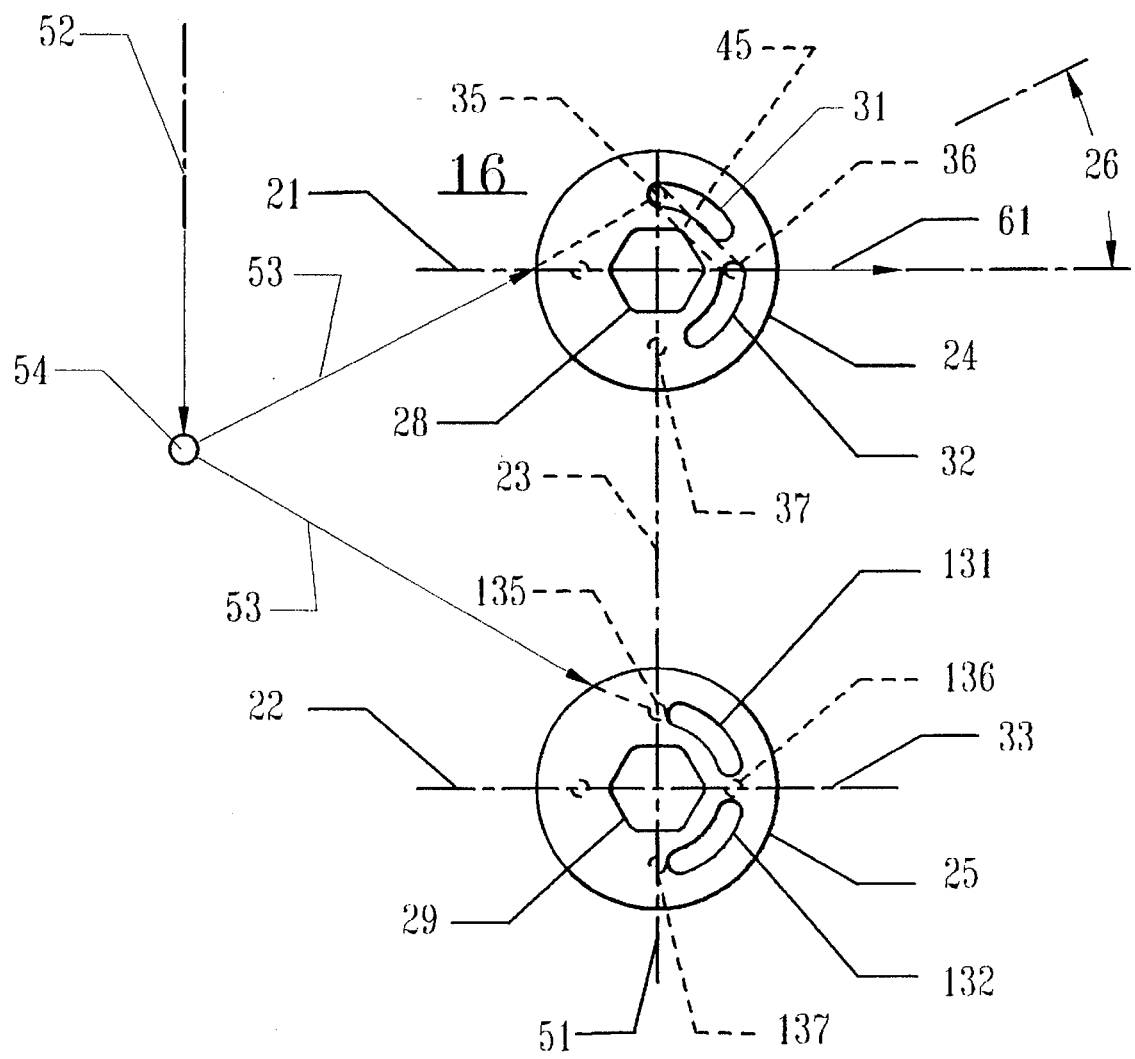
FIG. 3 is a diagrammatic view of valve rotors and their operation according to an embodiment of the invention.
Figure 4:
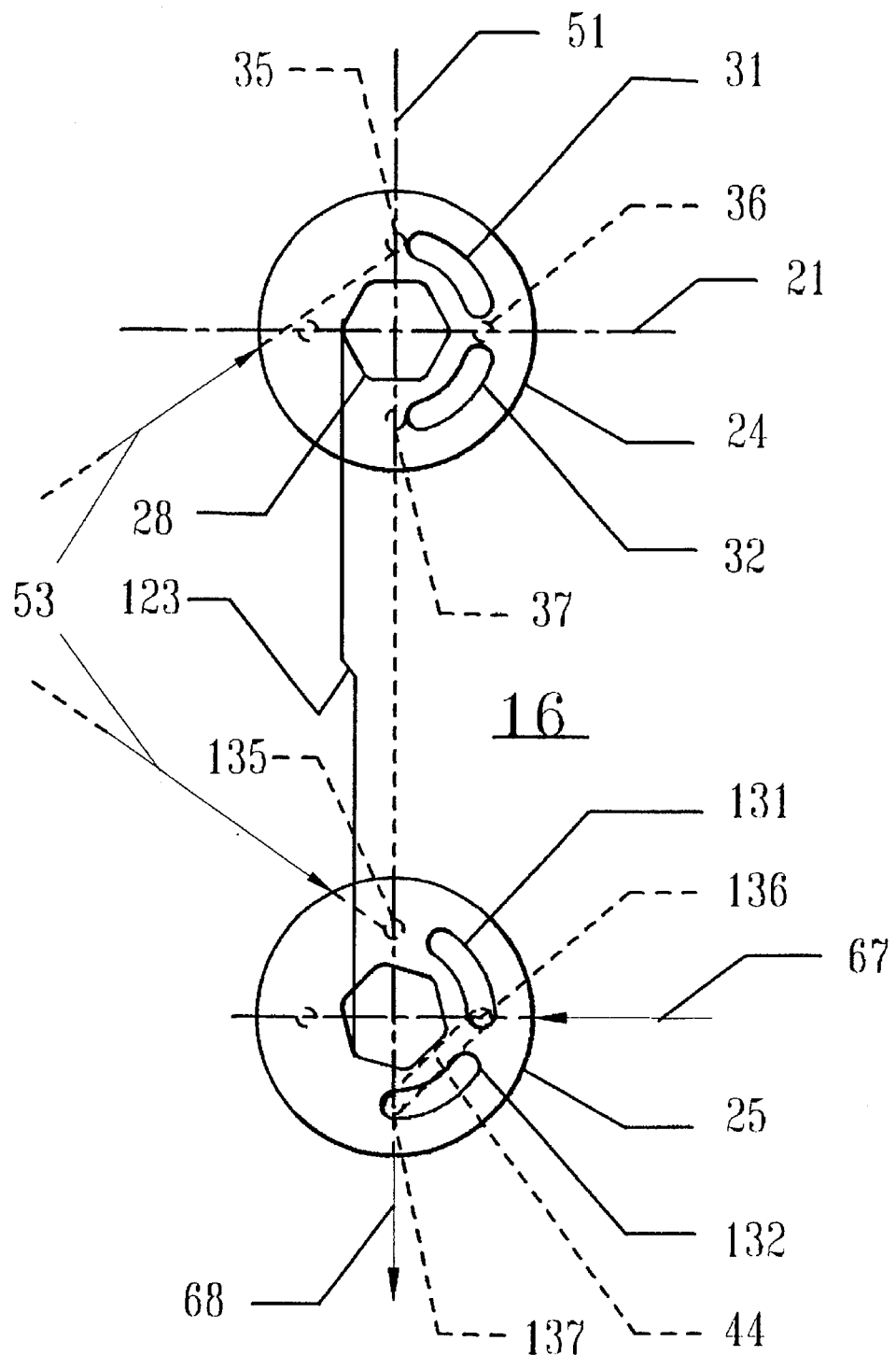
FIGS. 4 and 5 are views similar to FIG. 3 of alternatives according to embodiments of the invention.
Figure 5:
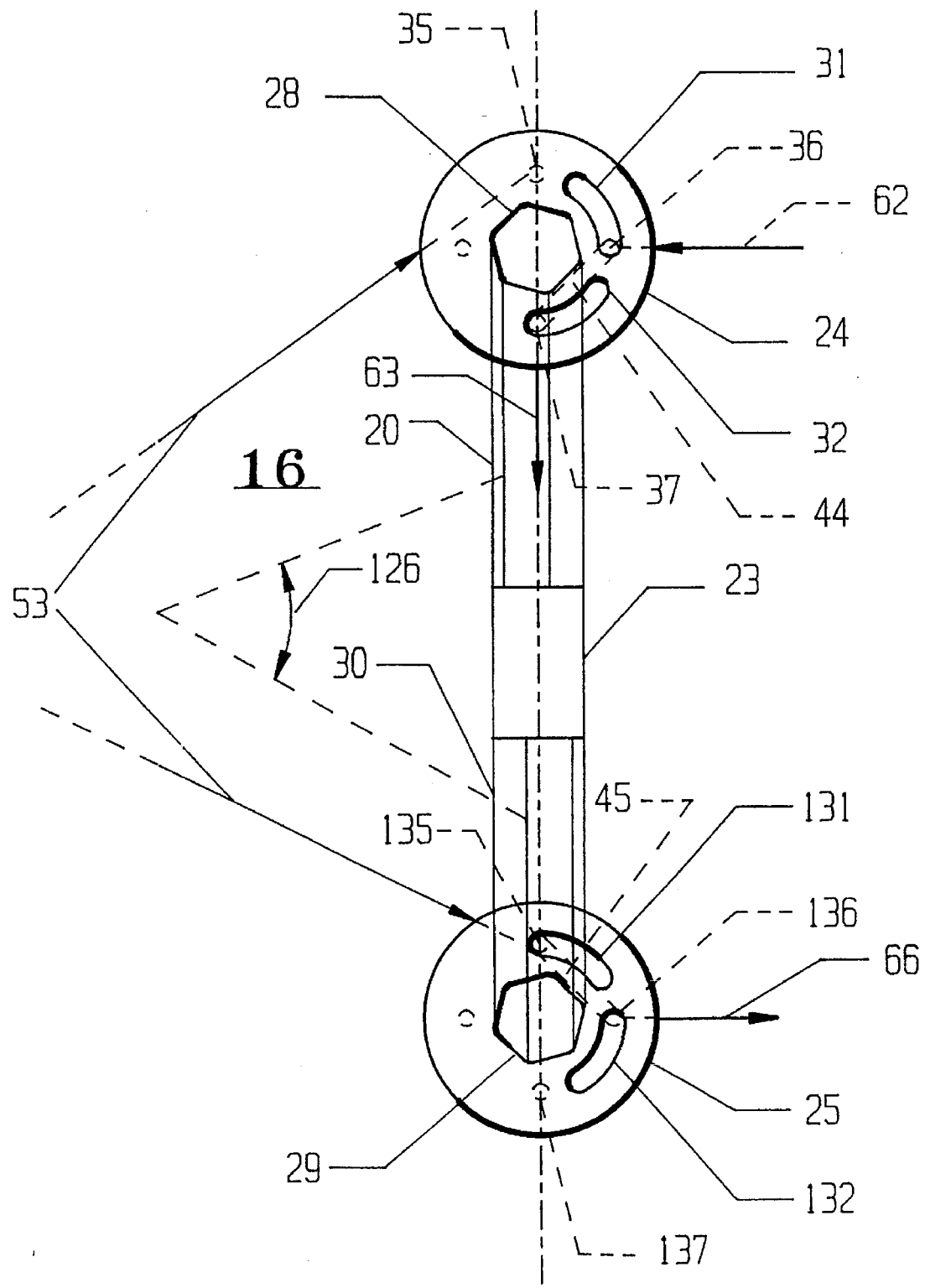

By way of example, FIG. 3A shows a third valve rotor or rotary disc 124 that may be substituted for the rotary disc 24 in the valve structures shown in FIGS. 1 to 5, for instance. The combination so far disclosed may include such third operating rotor 124 as a substitute for the first operating rotor 24 in the first fluid leveling valve or valve structure.

Such third operating rotor 124 may be different from the first and second operating rotors 24 and 25. By way of example, as shown in FIG. 3 the third disc 124 may have an offset or phase angle 326 that is different from the phase angle 26, for instance. Consequently, if the third disc 124 is substituted for the disc 24 in FIG. 3, for instance, as indicated by the arrow 101, then the fluid suspension 14 will seek and will operate at a third operating level or ride height 57 or 157 as the level sensor lever 19 operates that substituted disc 124 through the above mentioned cycles of FIGS. 3 to 5, for instance.

The first, second and third operating rotors 24, 25 and 124 have different phase differences relative to each other. As shown by way of example in FIG. 2, the operating level 57 or ride height 157 is different from both operating levels or ride heights 21 and 22 or 121 and 122.

Within the scope of the invention, the same kind of effect is realizable by providing for the angled shaft 23 shown in FIG. 5 a replacement shaft on which the upper and lower hexagonal disc drive portions are offset relative to each other at an angle other than zero and other than 126.

The shaft 23 may be seen as a first common shaft for ganging the first and second operating rotors in tandem at the above mentioned angular offset. A second common shaft 123 may be provided as a substitute for the first common shaft for ganging the first and second operating rotors 24 and 25 in tandem as an angular offset different from the first mentioned angular offset. Such a second or substitute shaft is symbolically shown at 123 in FIG. 4, as it may be a variation of the first common shaft shown in FIG. 5.

In either case, different operating levels, such as shown at 21, 22 and 57, or different ride heights, such as shown at 121, 122 and 157, may alternatively be realized for the fluid suspension system 14.

Figure 6:
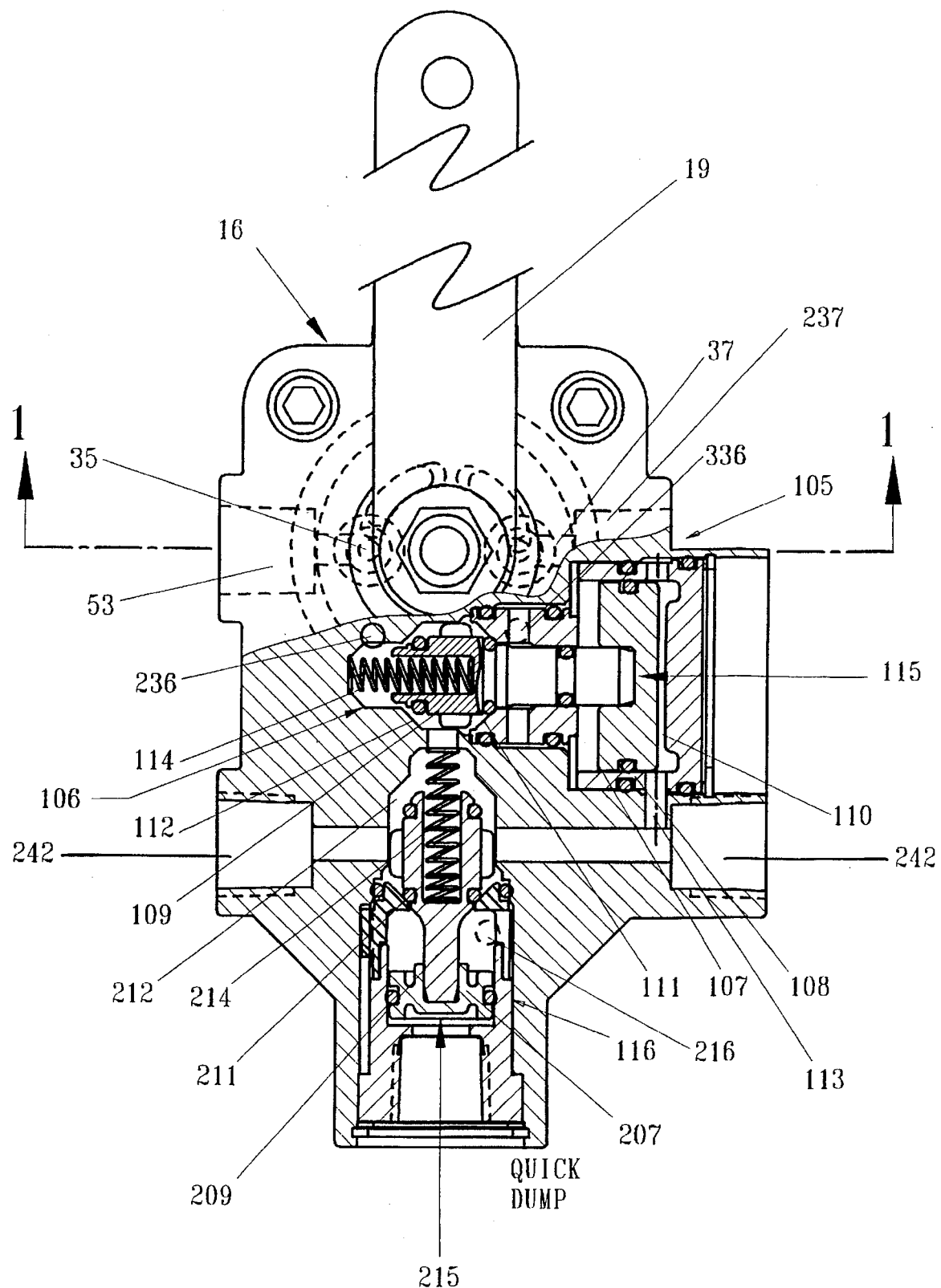
FIGS. 6 and 7 are top views, partially in section, of the type of dual fluid valve shown in FIGS. 1 to 5, including a fluid switcher in different stages of operation for alternatively actuating dual valves according to an embodiment of the invention.
Figure 7:
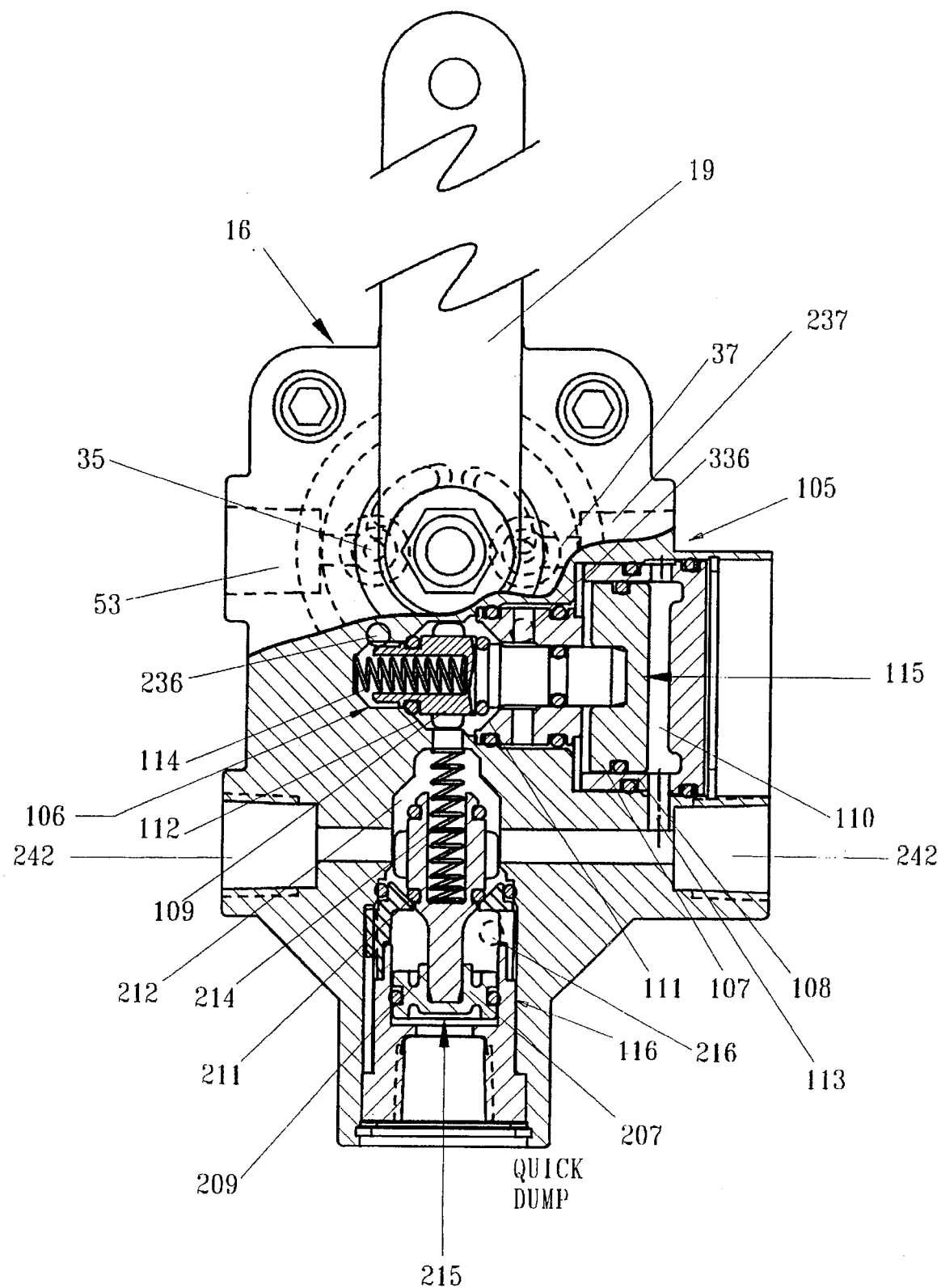

A fluid path switcher may be provided for connecting the fluid spring structure 42 selectively to the first fluid leveling valve 17, and alternatively to the second fluid leveling valve 18, such as via a line 142 shown in FIG. 2 or ports 242 shown in FIGS. 6 and 7.

The first and second fluid leveling valves are thus alternatively rendered active and inactive, respectively. The fluid suspension system according to a preferred embodiment of the invention thus alternates between leveling with the first fluid leveling valve 17 and leveling with the second fluid leveling valve 18, such as in response to anticipated or effected loading of the supported structure 10 and/or in response to pressure in the air spring structure 42 and/or in response to a change in operating conditions.

In this respect, FIGS. 6 and 7 show a fluid path switcher 105 according to an embodiment of the invention providing two alternative operating positions.

In particular, the fluid path switcher 105 has a valve system 106 for connecting a fluid suspension apparatus, such as the air spring 42 either to the first fluid leveling valve 17 or its valve port 36, or alternatively to the second fluid leveling valve 18 or its valve port 136, such as via bores or fluid channels 236 and 336, respectively.

The supply fluid flows 61 and 66 to air springs 42, and the fluid exhaust flows 62 and 67 from such air springs, such as shown in FIGS. 3, 4 and 5 may be provided through ports 242 to and from the first fluid leveling valve 17, such as in the position of the switcher valve 106 shown in FIG. 6, and alternatively to and from the second fluid leveling valve, such as in the position of such valve switcher valve 106 shown in FIG. 7.

The switcher valve 106 according to an embodiment of the invention is of a type wherein a combination of a piston 107 and cylinder 108 actuates a poppet or valve body 109 in response to a control fluid pressure selectively applied to that piston 107, such as via a control fluid chamber or cylinder head 110.

The switcher valve 106 also has two valve seats 111 and 112. In the position shown in FIG. 6, the valve body seals off the bore 336 at valve seat 111. In other words, the fluid path switcher valve 106 seals off the fluid port 136 and thereby the second fluid leveling valve 18 from the air spring 42 in the position shown in FIG. 6.

Conversely, in the position shown in FIG. 7 that fluid switcher valve 106 seals of the bore 236 at valve seat 112. In other words, that fluid path switcher valve 106 seals of the fluid port 36 and thereby the first fluid valve 17 from the air spring 42 in the position shown in FIG. 7.

The fluid switcher 105 may have an internal channel 113 through which fluid pressure is applied to the valve control cylinder 108 via control fluid chamber 110. Accordingly, pursuant to an embodiment of the invention, fluid pressure is applied from air spring 42 to the valve control cylinder 108.

As long as the fluid pressure in air spring 42 is relatively low, the valve bias spring 114 maintains the poppet 109 sealed against the valve seal 111, thereby shutting off the second fluid leveling valve 18 from the air spring 42. Accordingly, the first fluid leveling valve 17 then levels the supported structure 10 at the first level 21 or ride height 121.

However, if there is a relative high increase of the fluid pressure in the air spring 42, the fluid pressure in the valve control chamber 110 increases as well via channel 113, thereby pushing the piston 107 against the bias of the valve spring 114. This, in turn, connects the second fluid leveling valve 18 to the air spring 42 at the valve seat 111, while disconnecting the first fluid leveling valve 17 from air spring 42 at the valve seat 112.

The second fluid valve 18 thus is enabled to level the supported structure 10 at its second level 22 or ride height 122.

However, the first leveling valve 17 is reactivated and the second leveling valve 18 is deactivated, if the pressure in air spring 42 sinks to a relatively low level. Depending on the design strength of the control valve bias spring 114, the first and second leveling valves 17 and 18 and thereby the first and the second supported structure levels 21 and 22 or ride heights 121 and 122 or even a third level 57 or ride height 157 may thus be alternated according to various operating conditions.

By way of example, if the supported structure 10 experiences a large increase of the load supported thereby, then the pressure in air spring 42 will increase correspondingly, until the control valve in effect deactivates the first leveling valve 17, while activating the second leveling valve 18, as in FIG. 7.

Depending on the phase angle 26, 126 or 326 shown in FIGS. 3 and 5, between fluid leveling valve rotors or rotary discs 24, 25 or 124, this either will result in an increase of the supported structure level 21, 22 or 57 or ride height 121, 122 or 157, or in a decrease of such level or ride height. By selection of the disc 24 or 124 most appropriate for a given purpose, or by other variation of the phase angle 26, 126, 326, etc., and by selection of the most appropriate control valve spring 114, an optimum operating condition can be achieved for a particular road vehicle, supporting platform or other supporting or supported structure.

Because of the hysteresis of operation of the switcher 105 more fully disclosed below, either leveling valve 17 and 18 can handle an initial part of the load range nominally allocated to the other leveling valve, thereby stabilizing operation.

In this respect and in general, a control signal or pressure other than air spring pressure may be used to control alternation between first and second fluid valves 17 and 18.

For instance, when the pressurized fluid coupling or "glad hand" 97 is decoupled, there may be a significant change in fluid pressure, either in the tractor circuit including the main reservoir, or in the auxiliary suspension system 96. Such pressure change, or an inverse thereof, may be brought to bear on the valve piston 107, whereby an appropriate level 21, 22 or 57 or ride height 121, 122 or 157 may then be established or maintained in response to such pressure change.

Alternatively, decoupling of the trailer from the tractor will lighten the load on the tractor, whereby the air springs will expand. A resulting reduction of fluid pressure in the channel 113 will prompt the valve 106 to block off the leveling valve 18 from the air spring and to reconnect such air spring to valve 17.

In FIG. 7, an arrow 115 serves as a symbol of manually or automatically produced control forces for procuring a desired or necessary ride height or other level of the structure 10.

Incidentally, with respect to FIGS. 6 and 7 and otherwise within the scope of the invention, the control signal or arrow 115 may represent a vacuum that pulls the piston 107 to the right, as seen in FIG. 6.

In the summary, an embodiment of the invention provides a fluid pressure sensor, such as shown at 110, in the fluid suspension system. A fluid path switcher actuator, such as shown at 107, is connected between the fluid pressure sensor and the fluid path switcher so that such fluid path switcher selectively connects the fluid spring structure 42 to the first fluid leveling valve 17, and alternatively to the second fluid leveling valve 18 in response to pressure variations sensed by the fluid pressure sensor.

The fluid pressure sensor may be connected between the fluid spring structure 42, such as via a channel 113, and the fluid path switcher, such as seen at 109, so that the fluid path switcher selectively connects the fluid spring structure 42 to the first fluid leveling valve 17, and alternatively to the second fluid leveling valve 18 in response to pressure variations sensed by the fluid pressure sensor, such as at 110.

Since static friction is higher than dynamic friction for the sliding parts shown in FIGS. 6 and 7, and for any mechanical type of valve, and since O-rings and other seals used for various sealing purposes, such as shown in FIGS. 6 and 7, have a certain "memory" or hysteresis, the operation of the fluid path switcher, such as shown at 105 and equivalents thereof, has itself a hysteresis providing an overlap deadband in switching from either leveling valve 17 or 18 to the other leveling valve 18 or 17 in response to signal pressure variations at 115. Accordingly, pursuant to an embodiment of the invention, it is possible to use the air spring pressure itself, such as at 113, to operate the switcher 105.

According to an embodiment of the invention, the valve structure includes a further valve 116 that in essence may have the same structure as the valve 106. Accordingly, parts in valve 116 that correspond to parts in valve 106 are designated by reference numerals that are augmented by 100 relative to the reference numerals of such parts in the valve 106; starting with the piston 207 for the valve 116, corresponding to the piston 107 for the valve 106, and so forth.

Such valve 116 may be a fluid dumping valve that permits the driver or operator to dump fluid from the air springs 42 when deflation of the fluid suspension system is desired.

As an example of such dumping feature, the above-identified incorporated Daum et al. U.S. Pat. No. 5,161,817 discloses a dump actuator 40 with which a driver or operator applies a fluid pressure from a source 120 to a piston 50. One may also note the operator-controlled signal 90 represented by a control fluid line in FIG. 6 of that incorporated Daum et al patent. In either case, the operator control signal or fluid pressure is applied to the piston 207 of the dump valve 116 shown in the accompanying FIGS. 6 and 7.

In these accompanying FIGS. 6 and 7 an arrow 215 symbolizes such quick dump control fluid pressure or signal. For instance, pushing the piston 207 against bias spring 214 unseats the poppet valve 209 at its valve seat 211 and thus opens the air spring 42 to a quick dump path or outlet symbolically shown at 216, through which the air spring 42 or fluid suspension system 14 may be rapidly deflated, such as at the end of a load hauling or other operation.

At the same time, the dump signal on piston 207 seats the poppet valve 209 on its normally open seat 212, thereby preventing exhaustion of the fluid reservoir 41.

FIG. 2 also symbolizes such quick dump control by showing a control valve or switch 140 and a line 315 for applying a quick dump control fluid pressure or signal 215, such as mentioned above in connection with FIGS. 6 and 7.

This extensive disclosure will render apparent or suggest to those skilled in the art various modifications and variations within the spirit and scope of the invention.

We claim:

1. In a method of leveling a supported structure capable of carrying loads against positional variations relative to a supporting structure with a fluid suspension system between said supported structure and said supporting structure, the improvement comprising in combination:
   providing said fluid suspension system with a first fluid leveling valve for adjustment and operation of said supported structure to and at a first level relative to said supporting structure;
   providing said fluid suspension system with a second fluid leveling valve for adjustment and operation of said supported structure to and at an alternative second level relative to said supporting structure;
   adjusting said supported structure with said first fluid leveling valve to said first level relative to said supporting structure;
   sensing said first level;
   operating said first fluid leveling valve in response to said sensed first level to maintain said first level against positional variations;
   sensing load variations on said supported structure;
   alternating between leveling with said first fluid leveling valve and leveling with said second fluid leveling valve in response to said sensing of load variations, including alternatively adjusting said supported structure with said second fluid leveling valve to said second level relative to said supporting structure;
   sensing said second level; and
   operating said second fluid leveling valve in response to said sensed second level to maintain said second level against positional variations.

2. A method as in claim 1, including:
   providing said first fluid leveling valve with a first range of operation for movement and operation of said supported structure to and at said first level relative to said supporting structure; and
   providing said second fluid leveling valve with a second range of operation relative to said first range of operation for adjustment and operation of said supported structure to and at said second level relative to said supporting structure.

3. A method as in claim 2, including the step of:
   offsetting said first and second ranges of operation relative to each other.

4. A method as in claim 1, wherein said first and second fluid leveling valves are rotary valves having different rotary positions for leveling said supported structure differently relative to said supporting structure, said method including the steps of:
   providing said first fluid leveling valve with a first angular range of operation for adjustment and operation of said supported structure to and at said first level relative to said supporting structure; and
   providing said second fluid leveling valve with a second angular range of operation for adjustment and operation of said supported structure to and at said second level relative to said supporting structure.

5. A method as in claim 4, including the step of:
   providing a phase difference between said first and second angular ranges of operation.

6. A method as in claim 5, including:
   varying said second level with respect to said first level by varying said phase difference.

7. A method as in claim 1, including the step of:
   ganging said first and second fluid valves together.

8. A method as in claim 1, including the step of:
   ganging said first and second fluid leveling valves in tandem between said supported structure and said supporting structure.

9. In a method of leveling a supported structure against positional variations relative to a supporting structure with a fluid suspension system between said supported structure and said supporting structure, the improvement comprising in combination:
   providing said fluid suspension system with a first fluid leveling valve for adjustment and operation of said supported structure to and at a first level relative to said supporting structure;
   providing said fluid suspension system with a second fluid leveling valve for adjustment and operation of said supported structure to and at an alternative second level relative to said supporting structure;
   supporting said supported structure with fluid pressure;
   alternatively regulating said fluid pressure with said first and second fluid leveling valves;
   sensing said fluid pressure; and
   alternating between leveling with said first fluid leveling valve and leveling with said second fluid leveling valve in response to said sensed fluid pressure, including adjusting said supported structure with said first fluid leveling valve to said first level relative to said supporting structure;
   sensing said first level;
   operating said first fluid leveling valve in response to said sensed first level to maintain said first level against positional variations;
   alternatively adjusting said supported structure with said second fluid leveling valve to said second level relative to said supporting structure;
   sensing said second level; and
   operating said second fluid leveling valve in response to said sensed second level to maintain said second level against positional variations.

10. A method as in claim 9, including:
providing said first fluid leveling valve with a first range of operation for movement and operation of said supported structure to and at said first level relative to said supporting structure; and
providing said second fluid leveling valve with a second range of operation relative to said first range of operation for adjustment and operation of said supported structure to and at said second level relative to said supporting structure.

11. A method as in claim 10, including the step of:
offsetting said first and second ranges of operation relative to each other.

12. A method as in claim 9, wherein said first and second fluid leveling valves are rotary valves having different rotary positions for leveling said supported structure differently relative to said supporting structure,
said method including the steps of:
providing said first fluid leveling valve with a first angular range of operation for adjustment and operation of said supported structure to and at said first level relative to said supporting structure; and
providing said second fluid leveling valve with a second angular range of operation for adjustment and operation of said supported structure to and at said second level relative to said supporting structure.

13. A method as in claim 12, including the step of:
providing a phase difference between said first and second angular ranges of operation.

14. A method as in claim 13, including:
varying said second level with respect to said first level by varying said phase difference.

15. A method as in claim 9, including the step of:
ganging said first and second fluid valves together.

16. A method as in claim 9, including the step of:
ganging said first and second fluid leveling valves in tandem between said supported structure and said supporting structure.

17. In a method of leveling a supported structure against positional variations relative to a supporting structure with a fluid suspension system between said supported structure and said supporting structure, wherein said supporting structure includes an axle structure of a road vehicle, said supported structure includes a vehicular frame structure supported by said axle structure, and said fluid suspension system is a vehicular fluid suspension system between said vehicular frame structure and said axle structure, the improvement comprising in combination:
providing said vehicular fluid suspension system with a first fluid leveling valve for adjustment and operation of said supported structure to and at a first ride height of said vehicular frame structure;
providing said vehicular fluid suspension system with a second fluid leveling valve for adjustment and operation of said supported structure to and at an alternative second ride height of said vehicular frame structure, different from said first ride height;
sensing pressure in said vehicular fluid suspension system; and
alternating between leveling with said first fluid leveling valve and leveling with said second fluid leveling valve in response to said sensed pressure, including adjusting said vehicular frame structure with said first fluid leveling valve to said first ride height;
sensing said first ride height;
operating said first fluid leveling valve in response to the sensed first ride height to maintain said first ride height against positional variations;
alternatively adjusting said vehicular frame structure with said second fluid leveling valve to said second ride height;
sensing said second ride height; and
alternatively operating said second fluid leveling valve in response to the sensed second ride height to maintain said second ride height against positional variations.

18. In a method of leveling a supported structure against positional variations relative to a supporting structure with a fluid suspension system between said supported structure and said supporting structure, including a first fluid leveling valve and a level sensor for said fluid suspension system between said supported structure and said supporting structure, the improvement comprising in combination:
providing an alternative second fluid leveling valve including said level sensor; and
selectively operating said supported structure with said first and second fluid leveling valves at any one of three different operating levels relative to said supporting structure against positional variations.

19. A method as in claim 18, wherein:
said first and second fluid leveling valves are provided with different ranges of operation whereby to level said supported structure differently relative to said supporting structure against positional variations.

20. A method as in claim 19, wherein:
said different ranges of operation are operationally offset relative to each other.

21. A method as in claim 18, wherein:
said first fluid leveling valve is provided with alternative first and third ranges of operation for selectively adjusting and operating said supported structure to and at a first level and to and at a third level relative to said supporting structure against positional variations; and
said second fluid leveling valve is provided with a second range of operation for alternatively adjusting and operating said supported structure to and at a second level relative to said supporting structure against positional variations.

22. A method as in claim 21, wherein:
said first and second fluid leveling valves are provided as rotary valves having different rotary positions adapted to level said supported structure differently relative to said supporting structure against positional variations;
said first fluid leveling valve being provided with alternative first and third angular ranges of operation for selectively adjusting said supported structure to and at said first and third levels relative to said supporting structure against positional variations; and
said second fluid leveling valve being provided with a different second angular range of operation for alternatively adjusting and operating said supported structure to and at said second level relative to said supporting structure against positional variations.

23. A method as in claim 22, wherein:
said first, second and third angular ranges have phase differences therebetween.

24. A method as in claim 22, wherein:
said first, second and third angular ranges provide variable phase differences relative to each other.

25. In apparatus for leveling a supported structure against positional variations relative to a supporting structure with a fluid suspension system between said supported structure and said supporting structure, the improvement comprising in combination:

said fluid suspension system including between said supported structure and said supporting structure a level sensing lever, a first fluid leveling valve having a first operating rotor connected to said level sensing lever, and a second fluid leveling valve having a second operating rotor connected to said level sensing lever and angularly offset relative to said first operating rotor;

said fluid suspension system including between said supporting structure and said supported structure a fluid spring structure; and a fluid path switcher connecting said fluid spring structure selectively to said first fluid leveling valve, and alternatively to said second fluid leveling valve;

a fluid pressure sensor in said fluid suspension system; and a fluid path switcher actuator connected between said fluid pressure sensor and said fluid path switcher so that said fluid path switcher selectively connects said fluid spring structure to said first fluid leveling valve, and alternatively to said second fluid leveling valve in response to pressure variations sensed by said fluid pressure sensor.

26. Apparatus as in claim 25, wherein:

said first and second operating rotors are ganged in tandem.

27. Apparatus as in claim 25, including:

a substitute rotor for said first operating rotor in said first fluid leveling valve different from said first and second operating rotors.

28. Apparatus as in claim 25, wherein:

said first and second operating rotors have therebetween a phase difference.

29. Apparatus as in claim 28, wherein:

said phase difference is variable.

30. Apparatus as in claim 25, wherein:

a substitute rotor for said first operating rotor in said first fluid leveling valve having an angular offset relative to said second operating rotor different from an angular offset of said second operating rotor relative to said first operating rotor.

31. Apparatus as in claim 25, including:

a first common shaft for ganging said first and second operating rotors in tandem at said angular offset; and a substitute common shaft for said first common shaft for ganging said first and second operating rotors in tandem at an angular offset different from the first-mentioned angular offset.

32. In apparatus for leveling a vehicular frame structure with a vehicular fluid suspension system relative to an axle structure of a road vehicle against positional variations, the improvement comprising in combination:

a fluid spring structure, a first fluid leveling valve, a second fluid leveling valve and a ride height sensor in said vehicular fluid suspension system between said vehicular frame structure and said axle structure;

said first fluid leveling valve and ride height sensor for operation of said vehicular frame structure at a first ride height relative to a road surface against positional variations;

said second fluid leveling valve and ride height sensor for operation of said vehicular frame structure at a second ride height relative to said road surface against positional variations;

a fluid path switcher connecting said fluid spring structure selectively to said first fluid leveling valve, and alternatively to said second fluid leveling valve; and a fluid pressure sensor connected between said fluid spring structure and said fluid path switcher so that said fluid path switcher selectively connects said fluid spring structure to said first fluid leveling valve, and alternatively to said second fluid leveling valve in response to pressure variations sensed by said fluid pressure sensor.

33. Apparatus as in claim 32, wherein:

said first and second fluid leveling valves have differently positioned first and second operating rotors corresponding respectively to said first and second ride heights.

34. Apparatus as in claim 32, wherein:

said first and second fluid leveling valves have different operating rotors operationally offset relative to each other in proportion to a difference between said first and second ride heights.

35. In apparatus for leveling a vehicular frame structure against load variations relative to an axle structure with a fluid suspension system between said vehicular frame structure and said axle structure, the improvement comprising in combination:

said fluid suspension system including between said vehicular frame structure and said axle structure a fluid spring structure, a ride height sensing lever, a first fluid leveling valve having a first operating rotor connected to said ride height sensing lever, and a second fluid leveling valve having a second operating rotor connected to said ride height sensing lever and angularly offset relative to said first operating rotor;

a fluid path switcher connecting said fluid spring structure selectively to said first fluid leveling valve, and alternatively to said second fluid levling valve; and a fluid pressure sensor connected between said fluid spring structure and said fluid path switcher so that said fluid path switcher selectively connects said fluid spring structure to said first fluid leveling valve, and alternatively to said second fluid leveling valve in response to pressure variations sensed by said fluid pressure sensor.

36. Apparatus as in claim 35, wherein:

said first and second operating rotors are ganged in tandem.

37. Apparatus as in claim 35, wherein:

said first and second operating rotors have therebetween a phase difference.

38. Apparatus as in claim 37, wherein:

said phase difference is variable.

* * * * *